United States Patent [19]

Maurer et al.

[11] Patent Number: 5,734,422
[45] Date of Patent: Mar. 31, 1998

[54] DIGITAL VIDEO ERROR ANALYZER

[75] Inventors: Steven D. Maurer, Aloha; Robert W. Parish, Gaston, both of Oreg.

[73] Assignee: Tektronix, Inc., Wilsonville, Oreg.

[21] Appl. No.: 649,913

[22] Filed: May 17, 1996

[51] Int. Cl.$^6$ .................................. H04N 17/00
[52] U.S. Cl. .................... 348/184; 348/180; 348/192; 371/48; 371/57.1
[58] Field of Search ..................... 348/180, 184, 348/181, 607, 466, 470, 220, 192; 371/57.1, 61, 48, 52, 32, 5.1, 42, 47.1; 382/252, 232, 149, 151; H04N 17/00

[56] References Cited

U.S. PATENT DOCUMENTS

| | | | |
|---|---|---|---|
| 4,646,690 | 3/1987 | Sato | 371/47.1 |
| 4,752,825 | 6/1988 | Buckley et al. | 348/192 |
| 4,847,840 | 7/1989 | Jinguji | 371/37.1 |
| 5,446,492 | 8/1995 | Wolf et al. | 348/180 |

Primary Examiner—John K. Peng
Assistant Examiner—Jeffrey S. Murrell
Attorney, Agent, or Firm—Francis I. Gray

[57] ABSTRACT

A serial digital video data analyzer combines a co-processor capable of handling the serial digital video data stream bit rate with a microprocessor operating at a slower bit rate. The co-processor includes a video feature detection/decision module that identifies specified errors or features from the serial digital video data stream and freezes the portion of the serial digital video data stream around such feature/error in a video data store. The co-processor may also insert a cursor into the serial digital video data stream prior to display on a monitor to indicate the position of indicated errors. The acquired serial digital video data is transferred to the microprocessor for an initial determination as to whether further processing is required. If further processing is required, the results are displayed as a report and the microprocessor interacts with the co-processor to acquire additional data needed for processing or to indicate that the processing is completed and the co-processor should continue its feature detection/decision process. In this way any desired analysis of the serial digital video data stream may be performed.

1 Claim, 3 Drawing Sheets

DIGITAL VIDEO ERROR ANALYZER

BACKGROUND OF THE INVENTION

The present invention relates to digital video signal processing, and more particularly to digital video error analyzer for analyzing and displaying serial digital video data.

CCIR601 is an extremely high bandwidth digital video signal standard. The bandwidth is so high that normal microprocessor CPUs are unable to perform any significant signal processing to modify and/or analyze the data present in a CCIR601 conforming video input. There are a number of mechanisms which presently exist to work around this problem to allow some limited analysis and display of CCIR601 digital video data. These include:

Use of high speed co-processors, such as FPGAs, DSPs or ASICs, to directly manipulate these digital video streams for output to displays and/or detect simple error conditions.

Subsample CCIR601 data to allow specified lines of repetitive CCIR601 data to be reported.

Frame capture into a buffer based on a manual trigger, a picture "freeze", which can be used for static analysis of the data by a CPU on a picture by picture basis.

Frame capture into a buffer "on error", as indicated in proprietary marketing literature for an as yet nonexistent PC capture board, with presumably very simplistic "error" detection.

All of these mechanisms provide only a very simplistic error detection/analysis of the CCIR601 video data input.

What is desired is a digital video error analysis mechanism that provides for complete error detection/analysis of the CCIR601 video data input.

SUMMARY OF THE INVENTION

Accordingly the present invention provides a digital video error analyzer that uses a high speed acquisition co-processor in conjunction with a slower microprocessor. The co-processor includes a video feature detection/decision module for generating an acquisition enable signal for storing a portion of the digital video data in a video data store according to predetermined criteria in response to commands received from the microprocessor or external error detection devices. The co-processor also includes a video output generator for inserting specified signals, such as cursors, into the digital video data stream for display on an appropriate monitor. The microprocessor includes a user interface control module by which an operator interfaces with the digital video data analyzer, a realtime data error analysis module and a static data error analysis module which receive the acquired digital video data from the video data store for processing, and a capture sample module. The realtime data error analysis module makes an initial assessment from the data stored in the video data store whether certain video characteristics are present that require further processing. The microprocessor controls which characteristics the video data store examines and the conditions upon which it reports back. This is achieved via the control line to the decision module and/or via the microprocessor reprogramming the co-processor.

The objects, advantages and other novel features of the present invention are apparent from the following detailed description when read in conjunction with the appended claims and attached drawing.

Description of the Preferred Embodiment

Figure 1:
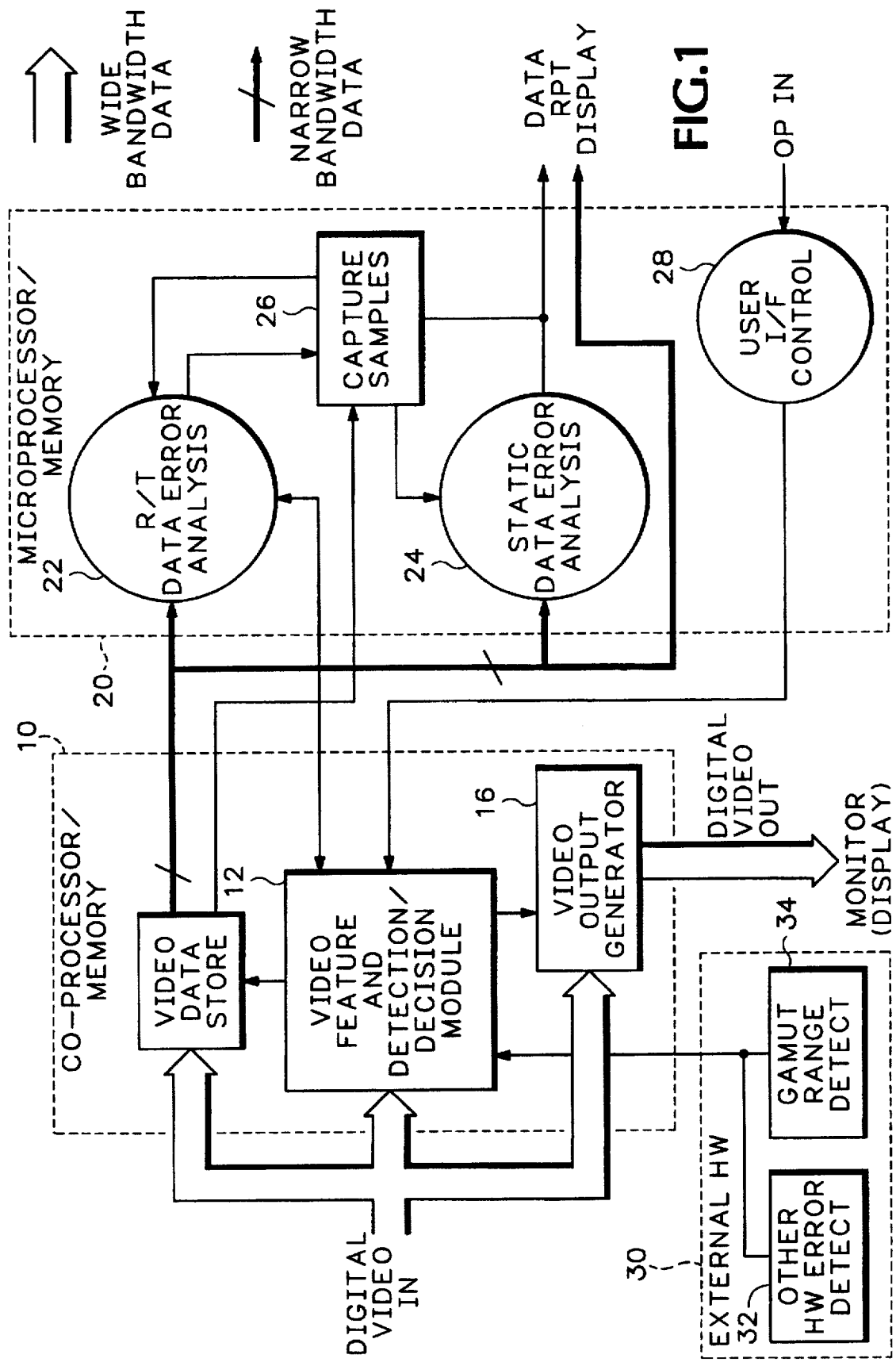
FIG. 1 is a functional block diagram view of a digital video error analyzer according to the present invention.

Referring now to FIG. 1 a serial digital video data signal, conforming to the CCIR601 standard, is input to a co-processor 10. The co-processor 10 includes a video feature detection/decision module 12, a video data store 14 and a video output generator 16, each of which have the serial digital video data signal as an input. The video feature detection/decision module 12 provides a control line which controls the acquisition of serial digital video data by the video data store 14. The video data store 14 provides the stored digital video data signal to a microprocessor 20 together with a control signal. The output from the video output generator 16 is the digital video data signal for display on a suitable monitor, as modified by input from the video feature detection/decision module 12.

The microprocessor 20 has both a realtime data error analysis module 22 and a static error analysis module 24 to both of which the acquired digital video data from video data store 14 of the co-processor 10 is input. The acquired digital video data from the video data store 14 also is provided as an output to a suitable display in a digital data format. A capture sample module 26 is coupled to the realtime data error analysis module 22 and the static error analysis module 24 to direct routing of the data acquired digital video data from the video data store 14. Output from the static data error analysis module 24 and the capture sample module 26 provide reports for display. A user interface control module 28 receives operator inputs and provides a control signal to the video feature detection/decision module 12 of the co-processor 10. The realtime data analysis module 22 also provides a control signal to the video feature detection/decision module 12.

Additional external hardware 30, which may include other hardware error detection circuits 32 and gamut range detectors 34, also provide a control signal to the video feature detector/decision module 22 of the co-processor 10.

The co-processor 10 is specialized to process CCIR601 digital video data to identify specific regions of interest, to detect subtle errors in the data, or to detect merely that an error may exist in the data. An operator via the user interface control 28 of the microprocessor 20 indicates to the video feature detection/decision module 12 the type of measurement/analysis desired. When the desired event occurs in the digital video data stream, the video feature detection/decision module 12 indicates to the video data store 14 to save that specific CCIR601 data and cease further data acquisition. The video data store 14 is a circular buffer of some predetermined length, such as three lines of the digital video data up to a complete frame, so that it is continually updating the data stored. The video data store 14 delivers either a fixed image or a sliding window of the acquired stored digital video data at a bit rate the microprocessor 20 can handle in accordance with the type of measurement/analysis to be performed. When the video data store 14 has completed the indicated acquisition, it signals the capture samples module 26, which in turn signals the realtime data error analysis module 22 to accept the data from the video data store. The realtime data error analysis module 22 makes an initial determination as to whether the acquired data meets certain parametric values or limits that require further processing. If the parametric values or limits are not satisfied, the realtime data error analysis module 22 indicates to the video feature detection/decision module 12 to begin acquiring data again, which results in unfreezing the video data store 14 to acquire new digital video data. If the parametric values or limits are satisfied, the capture sample module 26 in response to the realtime data error analysis module 22 indicates to the static data error analysis module 24 to accept the acquired data from the video data store 14 for processing. The output from the static data error analysis module 24 is provided as a report for display. Also the video feature detection/decision module 12 provides cursor data to the video output generator 16 when an error is detected to indicate on the monitor where the error occurs. The cursor may also be inserted via operator control through the user interface control module 28.

For some tests the microprocessor 20 simply uses access to the saved data in the video data store 14 to allow the operator to examine the data that contains a specific problem and its exact location on the display. In more sophisticated tests the microprocessor 20 uses access to a sliding window provided by the video feature detection/decision module 12 to check for errors unique to CCIR601 digital video and/or to the equipment which is used to generate the digital video data.

The video features which the video feature detection/decision module 12 may detect include: field and picture CRC errors; missing vertical or horizontal sync pulses; format, or placement, errors; non band-limited data; gamut range errors; signal level violations; errors in ancillary data; signal to noise ratio below a user specified threshold; electronic noise on unchanging picture inputs; stuck bits; stuck pixels; embedded audio and detection if the audio is muted; framing errors, entropy measurement; timing errors; etc.

The automated analysis is performed with the co-processor 10 and microprocessor 20 working in combination to provide one or more of the following capabilities as applied to CCIR601 data:

Allow the operator to interactively combine any number of the above tests so as to capture the first error of interest in the video data stream.

Use the microprocessor 20 in combination with cursor generators to create a visible crosshair on the video output which shows the exact location of the error.

Annotate digital readouts of static captured video data with symbolic CCIR601 identifiers, including the identification of V/H sync, ancillary data markers and data, and error identification.

Set a level or threshold of permissible error below which the co-processor 10 does not trigger.

Monitor errors without stopping capture, including the ability to perform histogram analysis of errors and the ability to detect and log intermittent errors.

Provide a microprocessor based running analysis of error characteristics and measure changes over time.

Selectively discard errors which lie outside a specific region of the CCIR601 data stream, such as the ability to discard all errors outside the vertical blanking region so as to focus only on errors introduced into the ancillary data.

These features are combined with a number of new displays which allow the user to understand the nature of the digital video data stream and/or any problems associated with it.

Figure 2:
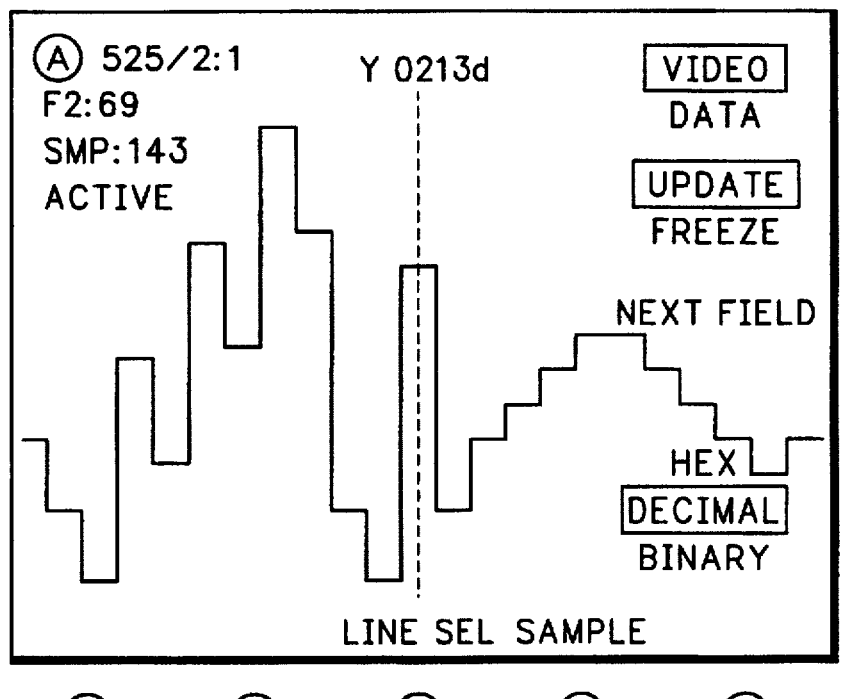
FIG. 2 is a plan view of a first display screen for a digital video error analyzer according to the present invention.

One display, as shown in FIG. 2, shows the video data samples as a non-interpolated waveform. This list is limited, showing less than 128 samples, and may display either the raw or demultiplexed elements (separated into its separate channel components—luminance and two chrominance components). The demultiplexed luminance component is shown in FIG. 2. In this display, as well as those described below, the video format (525/2:1), the field (F2), the line number (69) and sample within the line (143) are shown alphanumerically, with a vertical cursor located exactly at the indicated position. The component (Y) and the component value (0213d) at that location also are shown.

Figure 3:
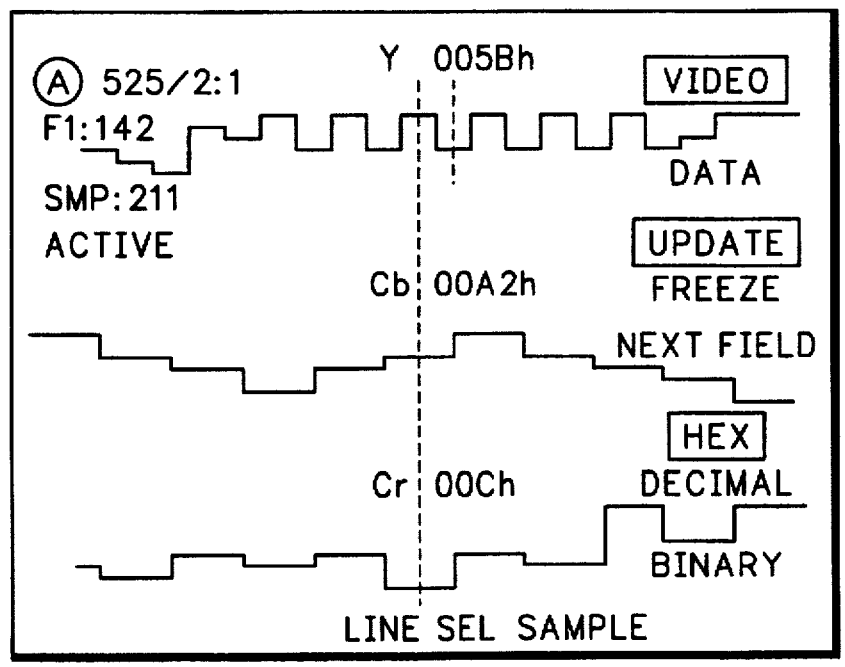
FIG. 3 is a plan view of a second display screen for a digital video error analysis mechanism according to the present invention.

A second display, as shown in FIG. 3, shows the demultiplexed, non-interpolated waveform channel components compressed vertically and stacked in component alignment. The center point of the Luminance channel is shifted to the right, indicated by the second short cursor through the luminance component only, when the operator dials to show a non-cosited luminance sample.

Figure 4:
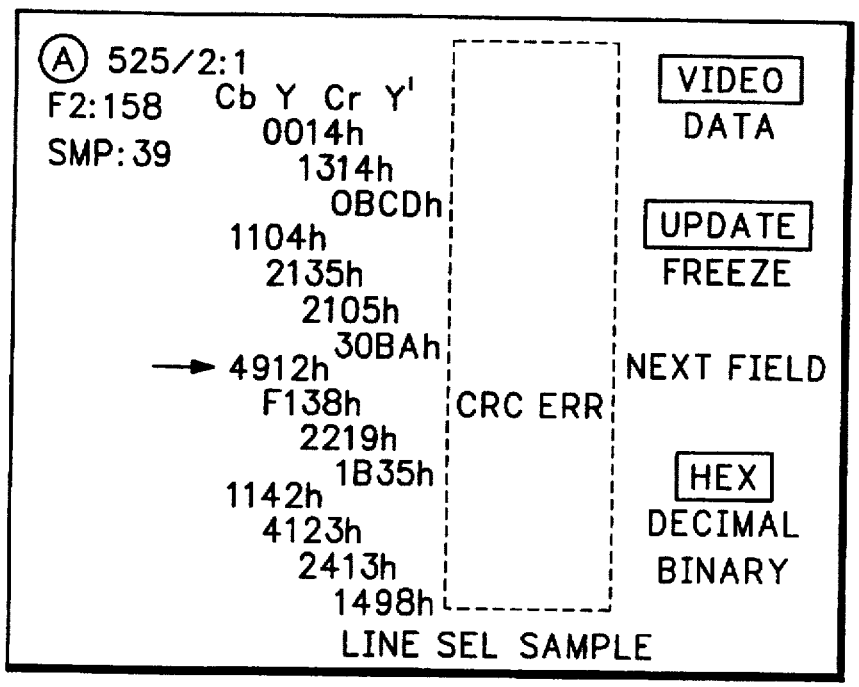
FIG. 4 is a plan view of a third display screen for a digital video error analysis mechanism according to the present invention.

A third display, as shown in FIG. 4, displays the pure digital values combined with automated analysis commentary about the values being displayed. In this case an arrow shows the current position, and the note "CRC ERR" in a comments field indicates the result of the analysis opposite the data that indicates the error.

Figure 5:
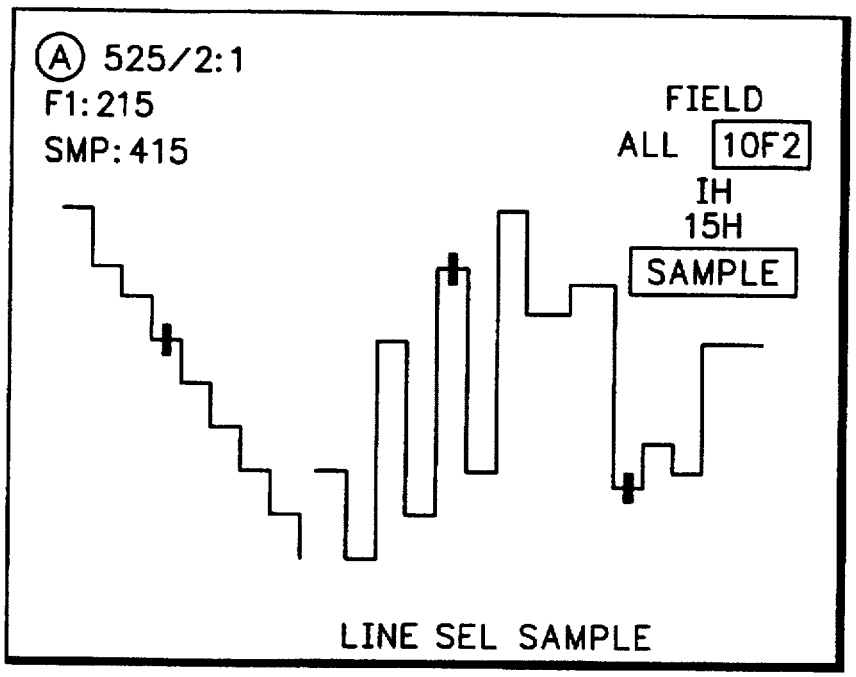
FIG. 5 is a plan view of a fourth display screen for a digital video error analysis mechanism according to the present invention.

Finally a fourth display, as shown in FIG. 5, shows blivets imposed on existing interpolated component waveforms in a parade display which indicate the position of the sample range in the waveforms shown in FIGS. 1 and 3.

An alternative sample selection method uses horizontal and vertical lines to form a cross-hair inserted into the digital video data stream for display on the monitor. This may be combined with sync insertion code to allow display of the cross-hair in both the vertical and horizontal blanking regions as well as the active video portion.

Thus the present invention provides a digital video data analyzer that uses a wide bandwidth co-processor for initial identification of specified features in the serial digital video data signal, whether errors or other features, and capture in a video data store of the data related to the specified features. The captured data is transferred to a microprocessor at a slower rate for determination as to whether further analysis is required, fleeing the co-processor to continue data acquisition either freely or at specified locations, and processing the desired data to provide a complete analysis of the serial digital video data signal for display.

What is claimed is:

1. A serial digital video data analyzer comprising:

a co-processor capable of processing an input serial digital video data stream as the data stream rate, the co-processor including means for identifying specified features/errors in the input serial digital video data stream and means for storing in a circular buffer a portion of the input serial digital video data stream, the identifying means terminating the storing in the storing means when the specified feature/error is identified to provide an acquired digital video data signal for further processing; and a microprocessor coupled to the co-processor for receiving the acquired digital video data signal at a slower rate than the data stream rate and for processing the acquired digital video data signal according to the specified feature/error, the microprocessor including means for analyzing the acquired digital video data signal in realtime to provide an initial determination and means for analyzing the acquired digital video data signal statically if indicated by the initial determination, the statically analyzing means providing a report for display.

* * * * *